(12) United States Patent
Lardy et al.

(10) Patent No.: US 7,089,207 B1
(45) Date of Patent: Aug. 8, 2006

(54) METHOD AND SYSTEM FOR DETERMINING A COMPANY'S PROBABILITY OF NO DEFAULT

(75) Inventors: Jean-Pierre Lardy, New York, NY (US); Vladimir Finkelstein, Short Hills, NJ (US); Philippe K Khuong-Huu, New York, NY (US); Yunong N Yang, Millington, NJ (US)

(73) Assignee: JPMorgan Chase & Co., New York, NY (US)

( * ) Notice: Subject to any disclaimer, the term of this patent is extended or adjusted under 35 U.S.C. 154(b) by 394 days.

(21) Appl. No.: 09/671,783

(22) Filed: Sep. 27, 2000

(51) Int. Cl.
*G06F 17/60* (2006.01)

(52) U.S. Cl. ............................... 705/38; 705/8; 705/35

(58) Field of Classification Search ................ 705/38, 705/8, 35
See application file for complete search history.

(56) References Cited

U.S. PATENT DOCUMENTS

| | | | |
|---|---|---|---|
| 5,692,233 A | 11/1997 | Garman | |
| 5,802,499 A | 9/1998 | Sampson et al. | |
| 5,812,988 A | 9/1998 | Sandretto | |
| 5,819,237 A | 10/1998 | Garman | |
| 5,819,238 A | 10/1998 | Fernholz | |
| 5,845,265 A | 12/1998 | Woolston | |
| 5,845,266 A | 12/1998 | Lupien et al. | |
| 5,852,811 A | 12/1998 | Atkins | |
| 5,884,286 A | 3/1999 | Daughtery, III | |
| 5,884,287 A | 3/1999 | Edesess | |
| 5,893,078 A | 4/1999 | Paulson | |
| 5,913,202 A | 6/1999 | Motoyama | |
| 5,926,800 A | 7/1999 | Baronowski et al. | |
| 5,940,810 A | 8/1999 | Traub et al. | |
| 5,946,667 A | 8/1999 | Tull, Jr. et al. | |
| 5,950,175 A | 9/1999 | Austin | |
| 5,950,176 A | 9/1999 | Keiser et al. | |
| 5,950,177 A | 9/1999 | Lupien et al. | |
| 5,963,923 A | 10/1999 | Garber | |
| 5,970,479 A | 10/1999 | Shepherd | |
| 5,978,780 A | 11/1999 | Watson | |
| 5,987,435 A | 11/1999 | Weiss et al. | |
| 5,991,743 A | 11/1999 | Irving et al. | |
| 6,012,042 A | 1/2000 | Black et al. | |
| 6,012,046 A | 1/2000 | Lupien et al. | |

(Continued)

FOREIGN PATENT DOCUMENTS

CA    2086269 A    *    6/1994

OTHER PUBLICATIONS

Shumway, Tyler; Forecasting Bankruptcy More Accurately: A Simple Hazard Model; Jul. 16, 1999; University of Michigan Busines School; pp. 1-32.*

(Continued)

*Primary Examiner*—Elaine Gort
(74) *Attorney, Agent, or Firm*—Milbank Tweed Hadley & McCloy LLP (57) ABSTRACT

Using observable market factors which reflect a current share price, a given share price, volatility in given share price, expected debt recovery fraction, and percentage standard deviation in the expected debt recovery fraction, the instant invention provides probability estimates for no default by a company within a given future time horizon. The invention has applications in the field of bond and company rating and calculation of credit spreads. The invention also provides a relationship between credit spreads, equity prices and volatility, useful as a price discovery tool in determining fair market price of the credit risk, on a name basis for credits that have public equity.

3 Claims, 7 Drawing Sheets

U.S. PATENT DOCUMENTS

| | | | |
|---|---|---|---|
| 6,016,483 | A | 1/2000 | Rickard et al. |
| 6,018,721 | A | 1/2000 | Aziz et al. |
| 6,018,722 | A | 1/2000 | Ray et al. |
| 6,021,397 | A | 2/2000 | Jones et al. |
| 6,021,398 | A | 2/2000 | Ausubel |
| 6,026,383 | A | 2/2000 | Ausubel |
| 6,058,377 | A | 5/2000 | Traub et al. |
| 6,058,379 | A | 5/2000 | Odom et al. |
| 6,061,662 | A | 5/2000 | Makivic |
| 6,067,533 | A | 5/2000 | McCauley et al. |
| 6,076,072 | A | 6/2000 | Libman |
| 6,078,903 | A | 6/2000 | Kealhofer |
| 6,078,904 | A | 6/2000 | Rebane |
| 6,085,176 | A | 7/2000 | Woolston |
| 6,088,685 | A | 7/2000 | Kiron et al. |
| 6,092,056 | A | 7/2000 | Tull, Jr. et al. |
| 6,098,051 | A | 8/2000 | Lupien et al. |

OTHER PUBLICATIONS

Covel, Simona; Credit Raters Blasé About Junk Cos Stock Price Surge; Moody's KMV Article; Dow Jones; Mar. 25, 2004; p. 1 and 2.*

Keenan et al. Historical Default Rates of Corporate Bond Issuers, 1920-1999. Moody's Investors Service, Jan. 2000.

Leland HE. Corporate Debt Value, Bond Covenants, And Optimal Capital Structure. J Finance. Sep. 1, 1994.

Brand, Leo & Reza Bahar. Greater Risk Means More Defaults in 1999. Standard & Poor's, Feb. 2000, 3-88.

Longstaff FA, Schwartz ES. A Simple Approach to Valuing Risky Fixed and Floating Rate Debt. J Finance. Jul. 1, 1995.

Merton RC. On the Pricing of Corporate Debt: The Risck Structure of Interest Rates. J Finance. Mar. 1, 1974. 449-470.

Jean-Pierre Lardy; E2C: A Simple Model to Assess Default Probabilities from Equity Markets; JP Morgan Credit Derivatives Conference, Jan. 16, 2002.

Finger, Christopher C., Finkelstein Vladimir, Pan George, Lardy Jean-Pierre, Ta Thomas; Credit Grades, Technical Document; May 2002.

Risk Currencies, interest rates, equities commodities, credit; Breaking Down the Barriers; pp. 2, 28, 29, 30, 33, 35; vol. 4/No. 8, Sep. 1991.

Equity to credit pricing; www.risk.net; pp. 107-100, Nov. 2001.

Leland, Hayne E., Journal of Finance; Corporate Debt Value, Bond Covenants, and Optimal Capital Structure; pp. 1213-1252, vol. XLIX, No. 4, Sep. 1994.

Hull, John, White, Alan; Journal of Derivatives; Valuing Credit Default Swaps II: Modeling Default Correlations; http://web33.epnet.com; pp. 12-21, vol. 8 Issue 3, Spring 2001.

Longstaff, Francis A., Schwartz, Eduardo S., Journal of Finance; A Simple Approach to Valuing Risky Fixed and Floating Rate Debt; pp. 789-819, vol. L., No. 3, Jul. 1995.

Black, Fischer, Scholes, Myron; Journal of Political Economic; The Pricing of Options and Corporate Liabilities; pp. 637-654, May 1972.

RiskMetrics Group, Introducing Credit Grades; Promoting Transparency in credit pricing.

Black, Fischer, Cox, John C., Journal of Finance; Valuing Corporate Securities: Some Effects of Bond Identure Provisions, pp. 351-367, vol. XXXL, No. 2, May 1976.

Schöbucher, Philipp J, Credit Derivatives Pricing Models: Models, Pricing and Implementation.

Merton, Robert, C., On the Pricing of Corporate Debt: The Risk Structure of Interest Rates; pp. 449-470.

* cited by examiner

METHOD AND SYSTEM FOR DETERMINING A COMPANY'S PROBABILITY OF NO DEFAULT

BACKGROUND

1. Field of the Invention

The instant invention relates to the field of credit and financing instruments, and more particularly to the field of determining company default probabilities using observable market information.

2. Description of the Related Art

In the credit market, there is considerable concern with and interest in understanding and predicting the risk for a given credit transaction. One of the risks is a default by the borrower, and subsequent loss of all or a part of the credit "investment". When extending credit, there is also an interest in comparing the relative risk for different borrowers, where one of the risks includes a risk of future default.

Understanding and providing a measure for the risk of a company's default has been attempted in a number of different ways. Most of those techniques use very complicated market factors, relationships and subjective judgement about the borrowers and market trends. Few of the known systems use a straight-forward, understandable, repeatable and dependable process.

What is needed is a system and method to provide a prediction or probability of a company's default, which uses primarily observable market factors and historic trends.

SUMMARY OF THE INVENTION

In one embodiment, the invention provides a method and also a system for determining a company's probability of no default over a future time horizon. The method includes determining a factor reflecting price volatility of shares in the company; determining a factor reflecting price of the shares in the company; determining a factor reflecting debt per share of the shares in the company; determining a factor reflecting expected debt recovery fraction; determining a factor reflecting percentage standard deviation of the expected debt recovery fraction; and determining the company's probability of no default using at least those factors.

In one embodiment, the method of the invention computes the company's probability of no default B(T) using equations substantially in the forms:

$$d = \frac{(S_0 + \overline{L}D)\exp(\lambda^2)}{\overline{L}D}; A_T^2 = (\sigma_s^* S^* / (S^* + \overline{L}D))^2 T + \lambda^2; \text{ and}$$

$$B(T) = N\left[\frac{\ln(d)}{A_T} - 0.5 A_T\right] - d * N\left[-\frac{\ln(d)}{A_T} - 0.5 A_T\right],$$

where $S_0$ is the factor reflecting current price of the shares in the company, $S^*$ is a given share price and is the factor reflecting price of the shares in the company, $\sigma_s^*$; is a standard deviation of share price returns and is the factor reflecting price volatility of shares in the company, D is the factor reflecting debt per share of the shares in the company; $\overline{L}$ is the factor reflecting expected debt recovery fraction, $\lambda$ is a percentage deviation of the expected debt recovery fraction and is the factor reflecting percentage standard deviation of the expected debt recovery fraction, and N is the cumulative standard normal distribution function.

In one embodiment, the invention includes computer executable software code stored on a computer-readable medium, the code for determining the company's probability of no default. The code includes code to determine a factor reflecting price volatility of shares of the company; code to determine a factor reflecting price of the shares of the company; code to determine a factor reflecting debt per share of the shares of the company; code to determine a factor reflecting expected debt recovery fraction; code to determine a factor reflecting deviation of the expected debt recovery fraction; and code to determine the company's probability of no default using the factors.

In one embodiment, the invention a computer-readable medium with computer executable software code stored on the medium, the code for determining the company's probability of no default. The software code includes code to determine a factor reflecting price volatility of shares of the company; code to determine a factor reflecting price of the shares of the company; code to determine a factor reflecting debt per share of the shares of the company; code to determine a factor reflecting expected debt recovery fraction; code to determine a factor reflecting percentage standard deviation of the expected debt recovery fraction; and code to determine the company's probability of no default using the factors.

In one embodiment, the invention includes a programmed computer for determining a company's probability of no default. The computer includes a memory to store program code and a processor to execute program code. The software code includes code to determine a factor reflecting price volatility of shares of the company; code to determine a factor reflecting price of the shares of the company; code to determine a factor reflecting debt per share of the shares of the company; code to determine a factor reflecting expected debt recovery fraction; code to determine a factor reflecting deviation of the expected debt recovery fraction; and code to determine the company's probability of no default using the factors.

The foregoing specific objects and advantages of the invention are illustrative of those which can be achieved by the present invention and are not intended to be exhaustive or limiting of the possible advantages that can be realized. Thus, the objects and advantages of this invention will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein.

It is understood that the drawings are for illustration only and are not limiting.

DETAILED DESCRIPTION OF THE DRAWINGS

Few successful companies are totally self financed, with most companies relying instead on the issue of various forms of financial instruments or securities to fund their operations and growth. Some of those instruments or securities are considered equity securities, while others are considered debt securities. In exchange for issuing the securities, the company receives cash. Depending on whether the security is a debt security or an equity security, the company either promises to repay the holder according to some terms, or the company provides the holder an equity share in the company. Typically, the holder of a debt security (or "bond") will receive regular and periodic payments on the security (comprising interest and principal) according to set terms. Because the payments include principal, at some point, the holder of the debt security will be completely repaid and the company will owe them nothing. As a result, the "return" on the debt security is known unless the company defaults, or stops making the required payments. However, even in the event of a company default, the holder of the debt security will have certain rights in the company assets, such as through bankruptcy proceedings.

In contrast to the holder of a debt security, the holder of an equity security is entitled to share in the profits of the company, and will similarly share in the losses of the company. As a result, the equity shareholder's "return" on their investment can be highly variable. In the event of default or bankruptcy of the company, the equity shareholder will only recover their investment after payment of superior interests, such as debt securities.

Because of the differences in relative risk and return on debt and equity securities, they satisfy different investment needs. Where an investor requires low risk of loss and stable return on their investment, they are inclined toward debt securities (e.g. bonds). When the investor is willing to accept greater risk in return for the possibility of greater return on their investment, they are inclined toward equity securities (e.g. stocks).

Though there are other differences between the two types of securities, they are not particularly relevant to the instant invention, except to the extent that in the event of a company's default, the holders of debt and equity securities are treated differently. Accordingly, it may be important to the holders of securities to have knowledge of the risk of the company's default. To assist the holders, there are various credit rating agencies, which assign ratings to companies according to their risk of default. These credit rating agencies include Fitch Investors Service, Moody's, and Standard & Poor's. Some issues, such as Treasury bonds, which are backed by the U.S. Government are considered free of risk of default. The highest rating for a company is a AAA rating. There are other lower ratings. Some company's "junk" bonds are considered as having a very high risk of default, with a commensurate low rating.

In the instant invention, the price of a company's stock or security, volatility of the company's stock or security price, information on the company's debt per share, an expected debt recovery fraction upon default, and the uncertainty in the debt recovery fraction are used to estimate the probability of the company not defaulting for various time horizons. This information is particularly useful in rating the company and making investment decisions in the credit market.

A starting point for the instant invention is the approach suggested in Merton, R. C., *On The Pricing Of Corporate Debt: The Risk Structure Of Interest Rates*, Journal of Finance 29, pp. 449–70, 1974. Another suggestion is provided by Leland, H., *Corporate Debt Value, Bond Covenants, And Optimal Capital Structure*, Journal of Finance 49, pp. 1213–52, 1994. Finally, another suggestion is provided by Longstaff, F. A. & Schwarts, E. S., *A Simple Approach To Valuing Risky Fixed And Floating Rate Debt*, Journal of Finance 50, pp. 789–819, 1995. As proposed in these articles, an event of default occurs when the asset value of the company falls below its liabilities; either at maturity (Merton) or before maturity (Leland).

Using this basic premise, the instant invention identifies a group of observable market indicators as inputs to a company default predictor, and provides relationships between the predictors as a closed form solution, suitable for predicting a company's probability of no default for any given time horizon from $t=0$ to $t=T$.

System of the Invention

Figure 1:
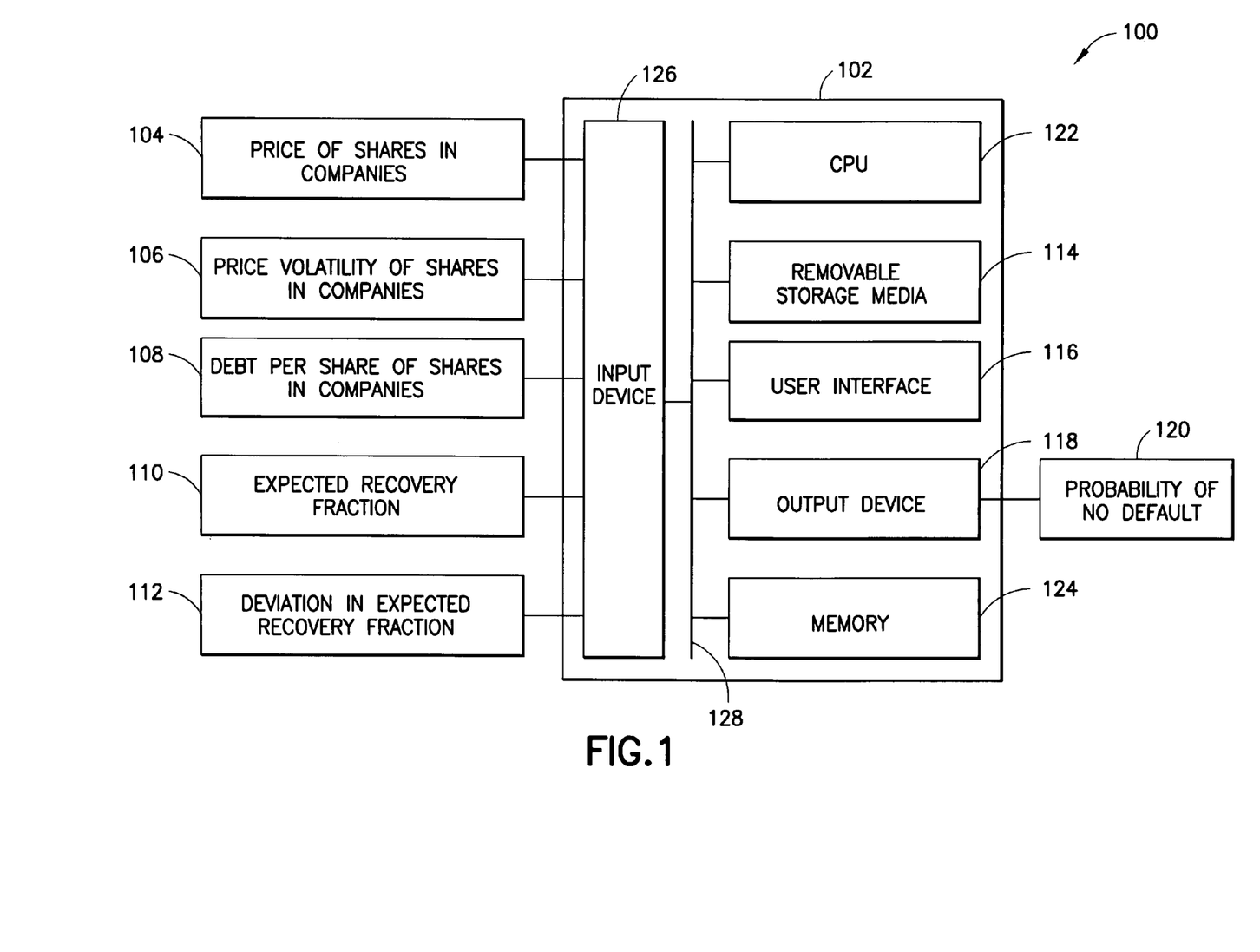
FIG. 1 illustrates a system according to an embodiment of the instant invention.

The method of the instant invention can be accomplished by hand. However, it is advantageous to perform the method in an automated manner and the embodiment illustrated in FIG. 1 is appropriate for that purpose. As illustrated, system 100 includes a computer 102, with various inputs 104, 106, 108, 110, 112 and output 120. The inputs 104, 106, 108, 110, 112 are configured to interface with computer 102 using input device 126. The output 120 is similarly configured to interface with computer 102 using output device 118. Computer 102 further includes a central processor unit (CPU) 122, a memory 124, a removable storage media 114 and a user interface 116, each of which is interconnected using bus 128. Computer 102 runs various computer programs, or software which include operating systems and applications programs. The computer programs may also include telephony communications programs, or network interface programs.

In one embodiment, computer 102 is a personal, desktop, laptop or personal digital assistant type of computer. Depending on the configuration, it may include a PENTIUM or similar class CPU 122. Memory 124 includes read only memory (ROM) and random access memory (RAM) with all of the variations thereof (EPROM, DRAM, SDRAM, etc.). Memory 124 is interconnected to CPU 122 and other elements of computer 102 by bus 128, which provides signal connection and a path for the exchange of data and information between the elements of computer 102.

In the illustrated embodiment, removable storage media 114 includes magnetic disk drives, both removable floppy and hard disk, flash memory chips or modules, as well as optical storage or compact disk (CD) and the associated drives. Removable storage media 114 can include both applications program instructions and data for the applications programs.

In the illustrated embodiment, user interface 116 includes keyboards, voice recognition software, and graphical display pointers (e.g. mouse, trackball, touch-screen & electronic pens), as well as video display terminals, all of which allow a user to interface with and control system 100.

In the illustrated embodiment, output device 118 includes data display terminals, printers, facsimile, e-mail, Internet connection and any of the types of devices which can be used to convert electronic information or data into an understandable form. Output device 118 provides a probability of no default 120, which is determined by computer 102 according to inputs 104, 106, 108, 110 and 112, using the method further described below.

In the illustrated embodiment, input device 126 includes network interface cards, modems, scanners, facsimile with optical character readable capability, and other devices which can convert information into a form that is useable by computer 102. It is possible that input device 126 and output device 118 are functions of the same device, such as a network interface card.

As illustrated in the embodiment of FIG. 1, various input data 104, 106, 108, 110, 112 are provided to computer 102 through input device 126. These sources of data are illustrated as individually connected to computer 102. However, it is possible that a single connection, such as through a modem, TTY or the Internet provides access to all of the input data. Input data includes share prices of companies 104, volatility of the share price of the companies 106, debt per share of the companies 108, expected debt recovery fraction 110 and deviation in the expected debt recovery fraction 112. It is also possible that computer 102 maintains historic information and computes volatility of share prices and deviation in expected debt recovery fraction from the historic information. Regardless of whether input data 104, 106, 108, 110, 112 are externally provided, or internally computed, these data constitute observable factors of individual companies, or industry groups.

Method of the Invention

At the beginning, the invention introduces a variable V which is termed an "asset value". However, this asset value does not necessarily coincide with any particular or actual asset value of the company. Rather, it is a reference value suitable for use with the invention, allowing comparisons and contrasts between different companies, in different industries. Next, the invention introduces the concept of a company's default event as the point in time where the asset value falls below a predetermined barrier. Rather than make the predetermined barrier a point of technical default where debt exceeds assets, this barrier is a more realistic estimate of the point where the company would likely default their regular payments of debt securities. This concept of establishing a default barrier was proposed by others and is not new to the invention. In the invention, we can assign a numeric value to the default barrier as $\overline{L}D$, where D is a ratio of a given debt per share in the company and $\overline{L}$ is an average or expected debt recovery fraction ($0 \leq \overline{L} \leq 1$) of the company's debt as a whole.

The ratio of debt per share, D, of the company is available from sources such as the company's annual report and regular SEC filings by the company. An average expected debt recovery fraction $\overline{L}$ reflects industry information on the recovery of debt following default for various companies and is available from sources such as Moody's and Standard & Poor's reports. As examples, in January 2000, Moody's published *Historical Default Rates Of Corporate Bond Issues*, 1920–1999. Similarly, in February 2000, Standard & Poor's published *Special Report: Ratings Performance 1999—Greater Risk Means More Defaults in* 1999, the disclosures of which are both incorporated herein by reference.

The invention also establishes a relation between Asset Value V, Asset Volatility $\sigma$, a given share or Stock Price S and share or Stock Price Volatility $\sigma_S$. Share or Stock Price Volatility $\sigma_S$ is a measure of the annualized standard deviation in the share or stock price return. There are a number of different formula that will provide a numeric value for this volatility in the share or stock price. Any of these formula are appropriate for the purpose here. One such equation for calculating annualized volatility $\sigma_S$ in the stock price (assuming 252 trading days in a year) is:

$$\sigma_S = \sqrt{\frac{\sum_{i=1}^{n}(x_i - \bar{x})^2}{n-1}} * \sqrt{252}, \quad (1)$$

$$x_i = \ln\left(\frac{P_i}{P_{i-1}}\right),$$

where n is the number of days in the period, $P_i$ is the stock price on the $i^{th}$ day of the n days and $\bar{x}$ is the average or mean of the $x_i$'s.

In the invention, the volatility $\sigma_S$ may be given either by historical price returns or by the implied stock volatility from the equity option market.

In the work of others, it has been shown that when considering probability distributions in stock and securities prices, the company value tends to follow a log-normal distribution as compared to a traditional bell shaped curve. One reason is that the company value is almost always positive and therefore the symmetric tails in a standard distribution curve do not provide an ideal good model. Thus, for the invention, we assume a log-normal asset value.

Using this log-normal asset value, the default probability for a company mostly depends on the distance R (in a log-normal space) between the asset value V described above and the default boundary $\overline{L}D$, in terms of standard deviation $\sigma$. This can be expressed as:

$$R = \frac{\ln(V/\overline{L}D)}{\sigma}. \quad (2)$$

Using Ito lemma we find the following relation between the company stock price S, volatility $\sigma_S$, and the asset value V, and asset value volatility $\sigma$:

$$\sigma_S S = \sigma V (\partial S / \partial V). \quad (3)$$

As a result, $$R = \frac{F}{S\sigma_s}, \quad (4)$$

where $$F = \ln(V/\overline{L}D)V(\partial S/\partial V). \quad (5)$$

It is clear from Eq. (4) that the term $S\sigma_S$, which depends on observable market data, plays a very important role in estimation of the default spread.

The function F is another important term that should be estimated. It can be assumed, that when the company's asset value is near the default boundary $\overline{L}D$, the stock price will change linearly with asset value as $S = \alpha(V - \overline{L}D)$, where $\overline{L} = V_{(S=0)}/D$. One can see that in this case $$F \approx S, \quad S \leq \leq \overline{L}D, \quad (6)$$

and F does not depend on the slope $\alpha$.

When the company's asset value is away from the default boundary $S/V \to 1$ and $$F \approx S ln(S/\overline{L}D), \quad S >> \overline{L}D. \quad (7)$$

The simplest expression for F that satisfies Eqs. (6) and (7) simultaneously is $$F = (S + \overline{L}D) \ln\left(\frac{S + \overline{L}D}{\overline{L}D}\right), \quad (8)$$

and the distance R is:

$$R = \frac{(S + \overline{L}D)}{S\sigma_s} \ln\left(\frac{S + \overline{L}D}{\overline{L}D}\right), \quad (9)$$

which leads to Eqs. (10) and (11) below.

Assuming that the company is not in default today and also has an initial asset value, we can set the initial asset value V at time t=0 (today), (i.e., $V_0$) as:

$$V_0 = S_0 + \overline{L}D, \quad (10)$$

where $S_0$ is the current stock price of the company.

Next, the invention determines volatility $\sigma$ of the asset value, by using a given share price S* and volatility of that given share price $\sigma^*_S$ so that:

$$\sigma = \sigma^*_s \frac{S^*}{S^* + \overline{L}D}. \quad (11)$$

It is important to note that the given share price S* is not necessarily the current price of a share $S_0$ of common or preferred stock, though it can be. For the purposes of flexibility and fine-tuning, it may be appropriate to select a given share price S* and associated volatility with consideration for the desired no default time horizon and the type of company or market. For example, if there has been significant market movement in the past month, which is not representative of the past movements, it may be appropriate to use a given share price S* that is biased to the period before the recent uncertainty. This may be particularly important when the no default time horizon is many years in the future and there is a belief that the recent movements are an aberration. Alternatively, if the period of interest for calculating probability of default is shorter (e.g., less than one year) then it may be appropriate to include the recent volatile period in establishing the given stock price S*. Thus, S* can be an instantaneous share price, as determined by the current selling or trading price, or it can be a recent or past daily mean, weighted mean, medium, high, low, closing or other value. The primary factor is that S* somehow reflects a reference share price, if using historical volatility $\sigma_S$.

The share price volatility $\sigma^*_S$ is the standard deviation of the give share price S*. Volatility is thus determined from the share price over a recent time interval. The interval of time used to calculate the share price volatility $\sigma^*_S$ should have a relationship to the period of time used to calculate the given share price S*.

In determining the interval of time that is used to determine $\sigma^*_S$ and S*, it is also appropriate to consider the length of time from t=0 to t=T (e.g., the time from today to the no default horizon). For example, if the no default horizon T is one year in the future, it may be appropriate to have S* and $\sigma^*_S$ reflect the most recent 3 months of stock price activity. Alternatively, if the no default horizon T is ten years in the future, it may be appropriate to have S* and $\sigma^*_S$ reflect a longer interval, such as the most recent three years of stock price activity.

If one uses implied volatility, as should be given by the equity option of the same maturity as the maturity of the credit spread.

As stated above, we consider the asset value V as a log-normal variable:

$$V = V_0 \exp\left(\sigma y - \frac{\sigma^2}{2}t\right) \quad (12)$$

where y is a factor representing Brownian motion with a zero mean and standard deviation $\sqrt{t}$ (standard Brownian motion).

Figure 2:
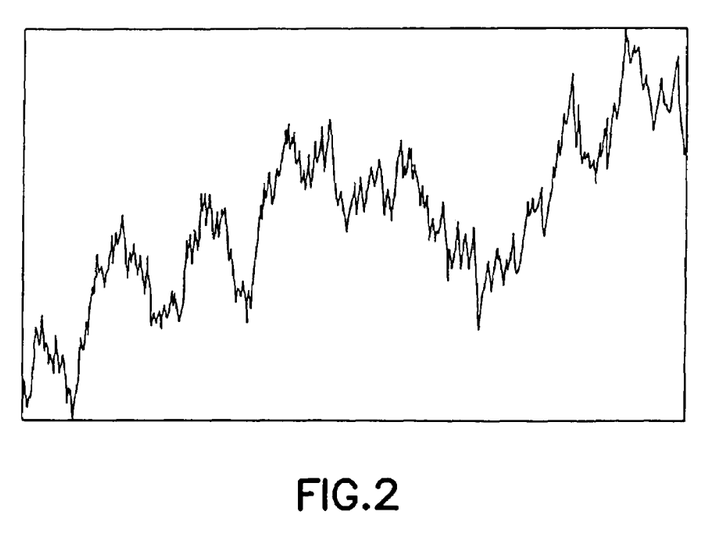
FIG. 2 illustrates a one-dimensional plot of Brownian motion.

The concept of using Brownian motion to model price movement in financial markets is well established. FIG. 2 illustrates a one-dimensional plot of Brownian motion. An example of a simple formula for generating a plot of price as random Brownian motion is:

$$P(t) = P(t-1)*\exp(\mu + 0.5*\sigma*Z), \quad (13)$$

where, P is the price, $\mu$ is the drift, $\sigma$ is the standard deviation and Z is a (0,1) normal random variable.

We next assume that the company's asset value V has a zero drift $\mu$ over time. The rationale behind this assumption is provided below.

Near the default boundary, the asset value V is approximated by the linear expression:

$$V = \overline{L}D + \frac{S}{\alpha}. \quad (14)$$

As a result, for the asset value drift $\mu$ one has $$\mu(\overline{L}D + S/\alpha) = (r-p)S/\alpha \Rightarrow \mu \to 0 \text{ as } S \to 0 \quad (15)$$

where (r−p) is the stock drift (r is the stock financing rate, p the dividend yield).

For large values of the stock price relative to the default boundary, it is reasonable to assume that the company will issue more debt as the equity value grows to keep the leverage level steady or pay dividends, distributing assets to its shareholders. It should be noted that this approach is consistent with most debt covenants allowing companies to pay dividends out of earnings, or retain earnings in assets that are not collateral to an anterior debt. In either case, the drift of the assets relative to the default boundary would in fact become zero.

As a result, while deriving the closed form solution (4) below, it is correct to assume that $\mu \sim 0$ is the best approximation for the pricing of credit as equity derivatives.

The expected debt recovery fraction $\overline{L}$ of debt is a key parameter in the evaluation of the default probability. Thanks to the publication of many statistics from the rating agencies, it is possible to develop a good knowledge of historical recovery values in case of bankruptcy, in particular for the United States. The main statistics are averages and standard deviations by classes of absolute seniority, and some statistics by Industry. As mentioned above, sources such as Moody's or Standard & Poor's provide this type of information.

One prevalent conclusion of these studies is the extreme variance of the distribution of recoveries, which is consistent with the difficult task of predicting what debt will recover in case of default. To illustrate this point, we can point out at least five unknown scenarios that will greatly affect recovery, and therefore the expected debt recovery fraction $\overline{L}$:

1) What is the credit event: failure to pay and bankruptcy or a troubled restructing with banks?

2) Is the default the result of financial or operational difficulties?

3) Will the company be restructured or liquidated?

4) What are the performance, value and liquidity of similar industrial assets?

5) To what extent does the divergence of interest between management, shareholders and several classes of debt holders result in wasted opportunities and loss of wealth for all investors?

Because of the different possible debt recovery fractions based on the answers to at least these four questions, it is helpful to incorporate both the mean $\overline{L}$ and the variance of recovery values (in the form of percent standard deviation $\lambda$ described below) as two parameters affecting the pricing of credit risk.

Therefore, in the instant invention, we also introduce the percentage standard deviation $\lambda (0<=\lambda<=1)$ to account for uncertainty of the debt recovery fraction $\overline{L}$. Percentage standard deviation $\lambda$ is computed from a standard deviation using the equation:

$$\lambda = \frac{\sigma_L}{\overline{L}} \quad (16)$$

where, $\sigma_L$ is the standard deviation of historical debt recovery fractions L, and expected debt recovery fraction $\overline{L}$ is the mean or average of the historical debt recovery fractions L.

Having provided a basis for the inter-relationship between the various factors in determining a company's future probability of no default, we can provide a closed form formula for the probability of no default B(T) between times t=0 and t=T in the form:

$$B(T) = N\left[\frac{\ln(d)}{A_T} - 0.5A_T\right] - d*N\left[-\frac{\ln(d)}{A_T} - 0.5A_T\right], \text{ and} \quad (17)$$

$$A_T^2 = (\sigma^*_S/(S^* + \overline{L}D))^2 T + 2\lambda^2, \quad (18)$$

$$d = \frac{(S_0 + \overline{L}D)\exp(\lambda^2)}{\overline{L}D}. \quad (19)$$

All of the factors have been previously described except the factor N( ) in Eq. (17), which is the cumulative standard normal distribution function. It is notable that the company's probability of no default is thus described completely with reference to observable market information. Further, the intermediate factors, such as initial asset value $V_0$, and asset volatility $\sigma$, which are functions of the same observable market information, have been eliminated by incorporation in the final closed form equations.

From the above, it can also be observed that the annualized default spread, s(T), for a time horizon T is then given by:

$$s(T) = -\frac{1}{T}\ln(B(T)) \quad (20)$$

The model produces a wide range of possible term structures of default spreads s(T).

Figure 3:
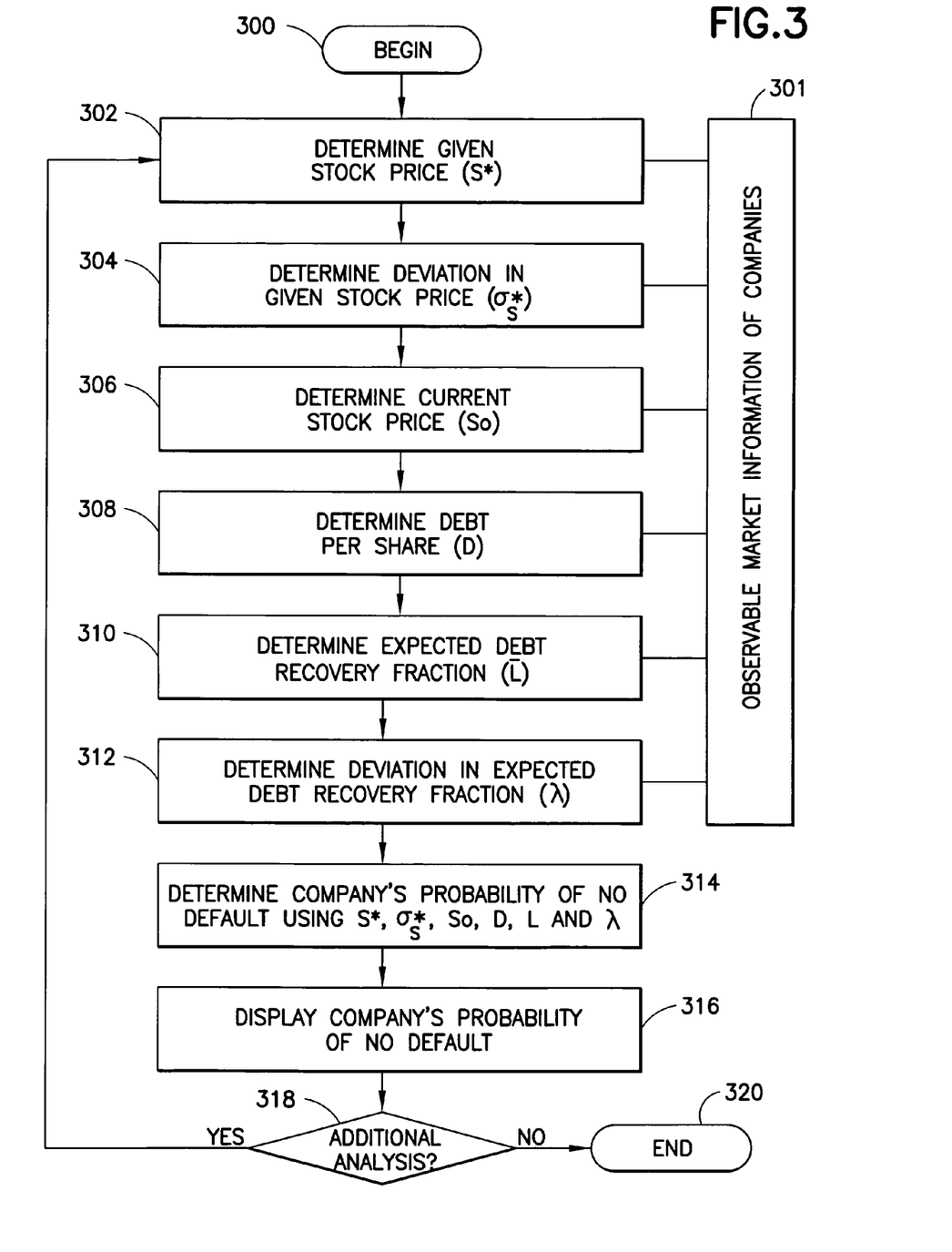
FIG. 3 illustrates a method according to an embodiment of the instant invention.

Referring now to FIG. 3, we provide an example embodiment of the method of the invention. The method begins with system 100 at step 300. At step 302, system 100 determines a given share price (S*) of the company. As stated above, the given share price (S*) of the company is one aspect of the observable market information 301 used by the invention. This information is available from a variety of soures, such as regular or real-time reporting, such as stock trade information. Observable market information 301 is also available through publications such as company annual reports, Securities and Exchange filings, and market analysis or reporting available from companies such as Moody's and Standard & Poor's.

At step 304, system 100 determines volatility ($\sigma^*_S$) of the given stock price (S) of the company. This information may be part of observable market information 301 that is readily available, or it may be determined by system 100 from the variously reported stock prices.

At step 306, system 100 determines a current stock price ($S_0$) of the company. This information is also part of observable market information 301.

At step 308, system 100 determines the amount of debt per share (D) of the company. This information is also part of the observable market information 301.

At step 310, system 100 determines the expected debt recovery fraction ($\overline{L}$). This information is also part of the observable market information 301.

At step 312, system 100 determines the percentage standard deviation in the expected debt recovery fraction ($\lambda$). This information is also part of the observable market information 301.

At step 314, system 100 uses the given stock price (S*), the deviation of the stock price($\sigma^*_S$), the current stock price($S_0$), the debt per share of stock(D), the expected debt recovery fraction ($\overline{L}$) and the deviation in the expected debt recovery fraction ($\lambda$) to determine the company's probability of no default.

At step 316, system 100 provides the company's probability of no default on output device 118.

At step 318, system 100 determines whether additional probabilities are required. If additional probabilities are required, system 100 branches to step 302. Otherwise, system 100 branches to step 320 and ends.

In the embodiment illustrated in FIG. 3, information for determining the various factors is shown as part of the observable market information 301. It is also possible that system 100 determines some of the factors internally. In particular, system 100 may calculate either or both of the factors representing volatility ($\sigma^*_S$) of the given stock price (S*) of the company and percentage standard deviation ($\lambda$) of the expected debt recovery fraction ($\overline{L}$).

Compared to the works of Merton and Leland, the instant invention has the following features:

The invention emphasizes focusing on the key stock volatility terms $S^*\sigma^*_S$ in addition to the stock price $S_0$ as credit is priced as an Exotic Equity Derivative.

In the invention, the use of an approximation for the asset volatility term σ, as well as the drift term μ allows one to find a simple closed form solution and focus on the interpretation of its key parameters.

The linear approximation for initial asset value $V_0$ as a function of $S_0$ in the invention leads to a very generic closed form solution that can approximate any sophisticated model relying on similar fundamental assumptions.

The interpretation of the total recovery of debt, in percent of par, is an important parameter in the linear approximation for the volatility σ and initial asset value $V_0$.

The identification of the variance of debt recovery value A is a parameter playing an important role in the closed form solution of default probability and its term structure.

Using the invention thus described, it is possible to consider the impact of these observable market factors. As illustrated in Tables 1A, 1C, 1E and 1G below, the default probability is sensitive to the expected debt recovery rate of debt level ($\bar{L}$) and its percentage standard deviation (λ). Tables 1B, 1D, 1F and 1H below illustrate similar sensitivities in the credit spread of a debt instrument that carries the same recovery as the average.

TABLE 1A

Impact of λ on default probability
(S | D = 2, $\bar{L}$ = 0.5, $\sigma_S$ = 50%)

| Yr\λ | 0.2 | 0.3 | 0.4 | 0.5 |
|---|---|---|---|---|
| 1 | 5 | 15 | 41 | 85 |
| 2 | 66 | 90 | 124 | 165 |
| 3 | 164 | 185 | 211 | 239 |
| 4 | 256 | 269 | 285 | 300 |
| 5 | 330 | 336 | 343 | 349 |
| 6 | 387 | 388 | 388 | 387 |
| 7 | 431 | 428 | 423 | 416 |
| 8 | 464 | 458 | 450 | 440 |
| 9 | 489 | 482 | 471 | 458 |
| 10 | 509 | 499 | 487 | 472 |

TABLE 1B

Impact of λ on average credit spread
(S | D = 2, $\bar{L}$ = 0.5, $\sigma_S$ = 50%)

| Yr\λ | 0.2 | 0.3 | 0.4 | 0.5 |
|---|---|---|---|---|
| 1 | 3 | 8 | 21 | 42 |
| 2 | 33 | 45 | 62 | 83 |
| 3 | 82 | 92 | 106 | 120 |
| 4 | 128 | 135 | 142 | 150 |
| 5 | 165 | 168 | 172 | 174 |
| 6 | 194 | 194 | 194 | 193 |
| 7 | 215 | 214 | 212 | 208 |
| 8 | 232 | 229 | 225 | 220 |
| 9 | 245 | 241 | 236 | 229 |
| 10 | 254 | 250 | 244 | 236 |

TABLE 1C

Impact of $\bar{L}$ on default probability
(S | D = 2, λ = 0.4, $\sigma_S$ = 50%)

| Yr\L | 0.3 | 0.4 | 0.5 | 0.6 |
|---|---|---|---|---|
| 1 | 6 | 19 | 41 | 73 |
| 2 | 39 | 78 | 124 | 175 |
| 3 | 94 | 152 | 211 | 268 |
| 4 | 154 | 222 | 285 | 342 |
| 5 | 208 | 281 | 343 | 397 |
| 6 | 256 | 329 | 388 | 438 |

TABLE 1C-continued

Impact of $\bar{L}$ on default probability
(S | D = 2, λ = 0.4, $\sigma_S$ = 50%)

| Yr\L | 0.3 | 0.4 | 0.5 | 0.6 |
|---|---|---|---|---|
| 7 | 296 | 367 | 423 | 469 |
| 8 | 330 | 397 | 450 | 492 |
| 9 | 357 | 422 | 471 | 510 |
| 10 | 381 | 442 | 487 | 522 |

TABLE 1D

Impact of $\bar{L}$ on average credit spread
(S | D = 2, λ = 0.4, $\sigma_S$ = 50%)

| Yr\L | 0.3 | 0.4 | 0.5 | 0.6 |
|---|---|---|---|---|
| 1 | 4 | 11 | 21 | 29 |
| 2 | 27 | 47 | 62 | 70 |
| 3 | 66 | 91 | 106 | 107 |
| 4 | 107 | 133 | 142 | 137 |
| 5 | 146 | 168 | 172 | 159 |
| 6 | 179 | 197 | 194 | 175 |
| 7 | 207 | 220 | 212 | 188 |
| 8 | 231 | 238 | 225 | 197 |
| 9 | 250 | 253 | 236 | 204 |
| 10 | 266 | 265 | 244 | 209 |

TABLE 1E

Impact of λ on default probability
(S | D = 0.5, $\bar{L}$ = 0.5, $\sigma_S$ = 50%)

| Yr\λ | 0.2 | 0.3 | 0.4 | 0.5 |
|---|---|---|---|---|
| 1 | 320 | 677 | 1119 | 1541 |
| 2 | 533 | 710 | 899 | 1065 |
| 3 | 645 | 737 | 829 | 907 |
| 4 | 701 | 747 | 791 | 825 |
| 5 | 727 | 747 | 764 | 773 |
| 6 | 737 | 741 | 741 | 735 |
| 7 | 738 | 732 | 721 | 706 |
| 8 | 733 | 721 | 703 | 681 |
| 9 | 725 | 708 | 687 | 661 |
| 10 | 715 | 696 | 671 | 643 |

TABLE 1F

Impact of λ on average credit spread
(S | D = 0.5, $\bar{L}$ = 0.5, $\sigma_S$ = 50%)

| Yr\A | 0.2 | 0.3 | 0.4 | 0.5 |
|---|---|---|---|---|
| 1 | 160 | 339 | 560 | 771 |
| 2 | 266 | 355 | 449 | 533 |
| 3 | 323 | 368 | 415 | 453 |
| 4 | 351 | 373 | 395 | 412 |
| 5 | 364 | 373 | 382 | 386 |
| 6 | 369 | 370 | 371 | 368 |
| 7 | 369 | 366 | 361 | 353 |
| 8 | 366 | 360 | 352 | 341 |
| 9 | 362 | 354 | 343 | 330 |
| 10 | 357 | 348 | 336 | 321 |

TABLE 1G

Impact of $\overline{L}$ on default probability
(S | D = 0.5, λ = 0.4, σ$_S$ = 50%)

| Yr\L | 0.3 | 0.4 | 0.5 | 0.6 |
|---|---|---|---|---|
| 1 | 434 | 762 | 1119 | 1486 |
| 2 | 501 | 706 | 899 | 1081 |
| 3 | 554 | 702 | 829 | 943 |
| 4 | 589 | 700 | 791 | 869 |
| 5 | 610 | 697 | 764 | 819 |
| 6 | 622 | 691 | 741 | 782 |
| 7 | 626 | 683 | 721 | 751 |
| 8 | 631 | 674 | 703 | 725 |
| 9 | 630 | 665 | 687 | 702 |
| 10 | 627 | 655 | 671 | 682 |

TABLE 1H

Impact of $\overline{L}$ on average credit spread
(S | D = 0.5, λ = 0.4, σ$_S$ = 50%)

| Yr\L | 0.3 | 0.4 | 0.5 | 0.6 |
|---|---|---|---|---|
| 1 | 304 | 457 | 560 | 594 |
| 2 | 350 | 424 | 449 | 432 |
| 3 | 388 | 421 | 415 | 377 |
| 4 | 412 | 420 | 395 | 348 |
| 5 | 427 | 418 | 382 | 328 |
| 6 | 436 | 414 | 371 | 313 |
| 7 | 440 | 410 | 361 | 300 |
| 8 | 441 | 405 | 352 | 290 |
| 9 | 441 | 399 | 343 | 281 |
| 10 | 439 | 393 | 336 | 273 |

Tables 1A–1D illustrate a relatively low-risk company with S/D=2, while Tables 1E–1H illustrate a relatively high-risk company with S/D=0.5. In Tables 1A, 1C, 1E and 1G, the default probability is expressed in basis points. Thus, in Table 1A with (λ)=0.4, and T=5 five years, the default probability of the relatively low-risk company (S/D=2) is determined to be 343 basis points (or 3.43%) per year. For a similarly situated, but higher risk company (S/D=0.5), in Table 1E the default probability is determined to be 764 basis points (or 7.64%).

As illustrated in the tables, it is particularly interesting to see that these parameters have an important impact on the term structure with an opposite impact on the long term and the short term credit spread.

Figure 4A:
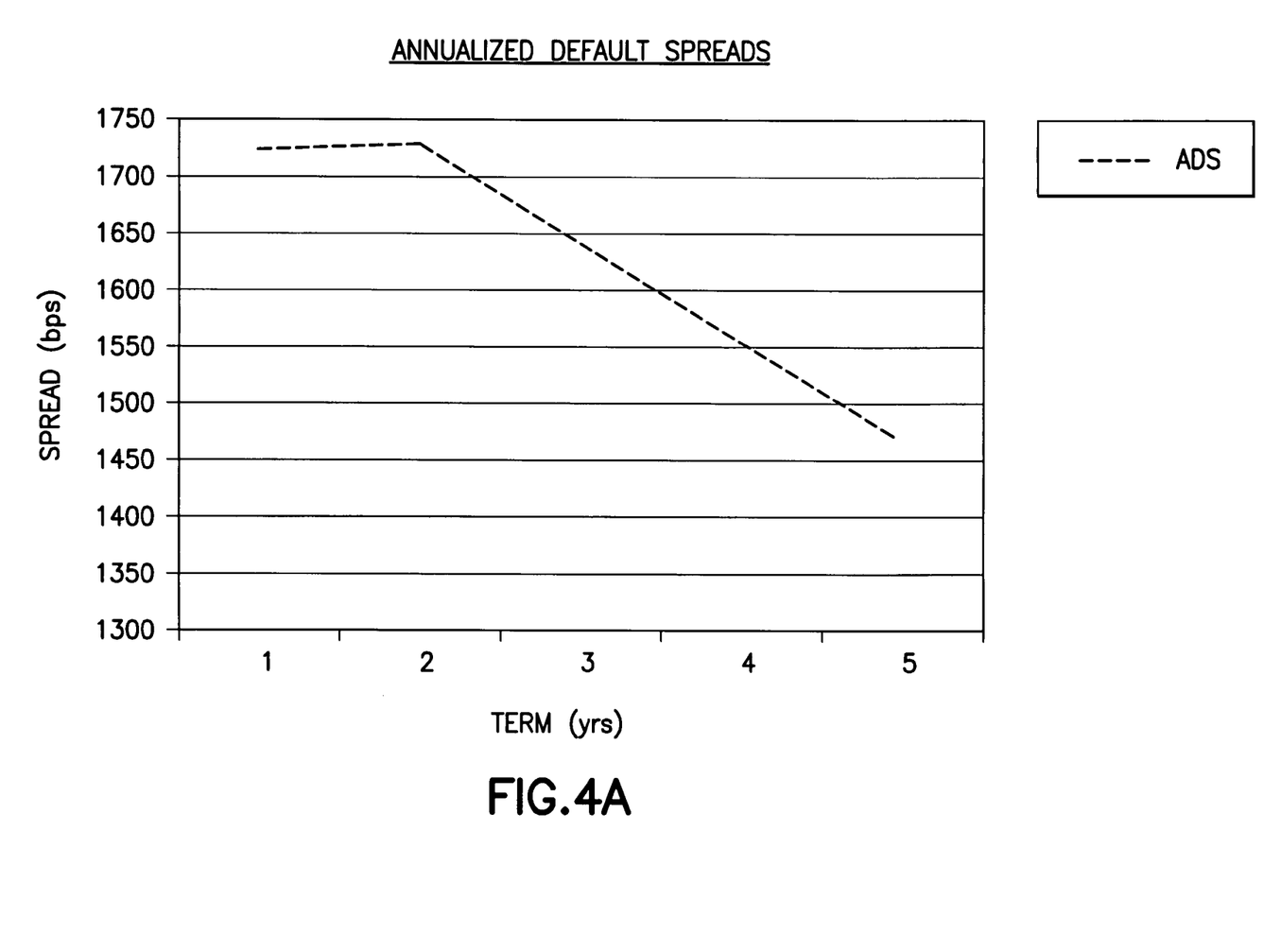
FIG. 4 illustrates different annualized default spreads for different factors.
Figure 4B:
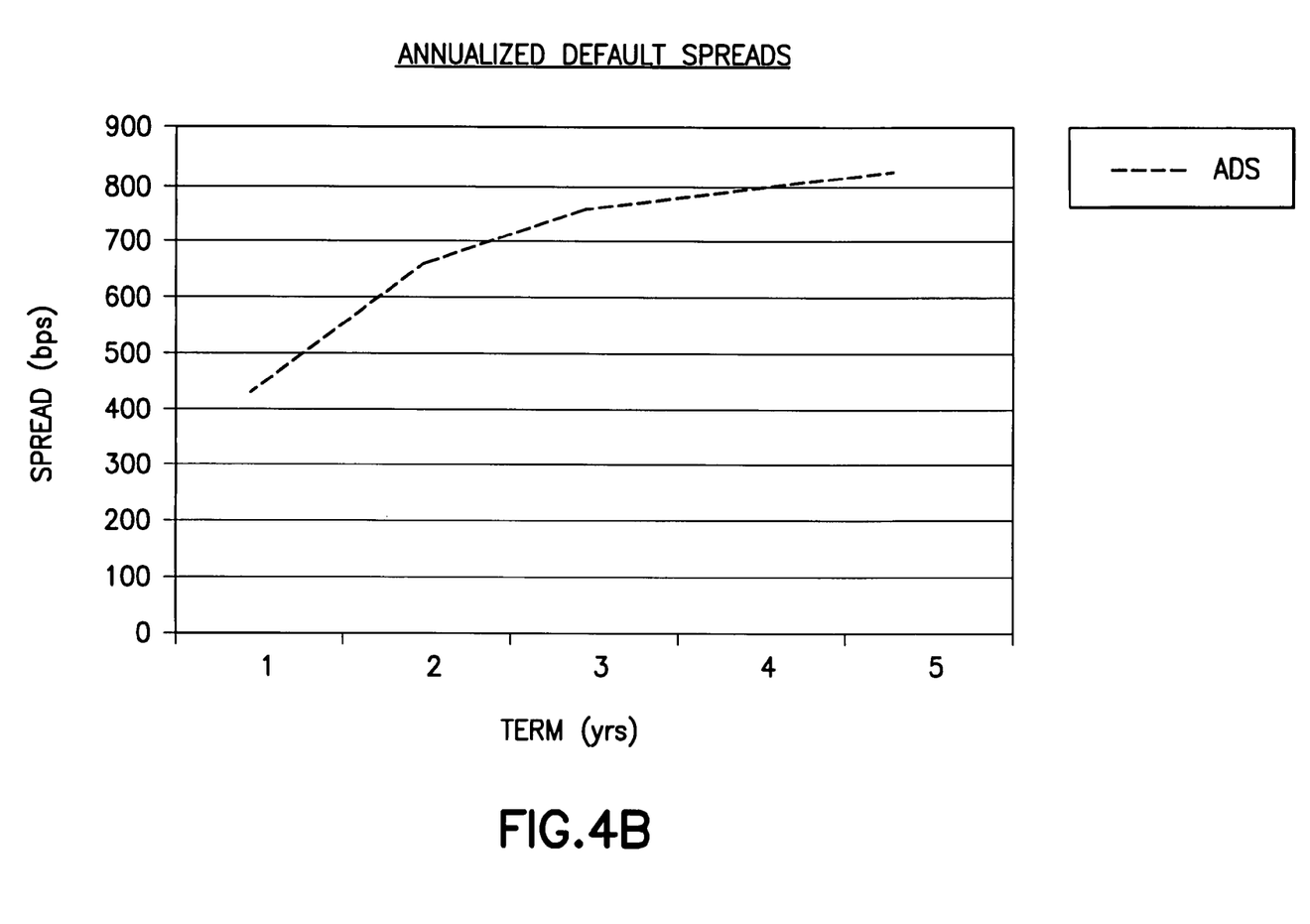
Figure 4C:
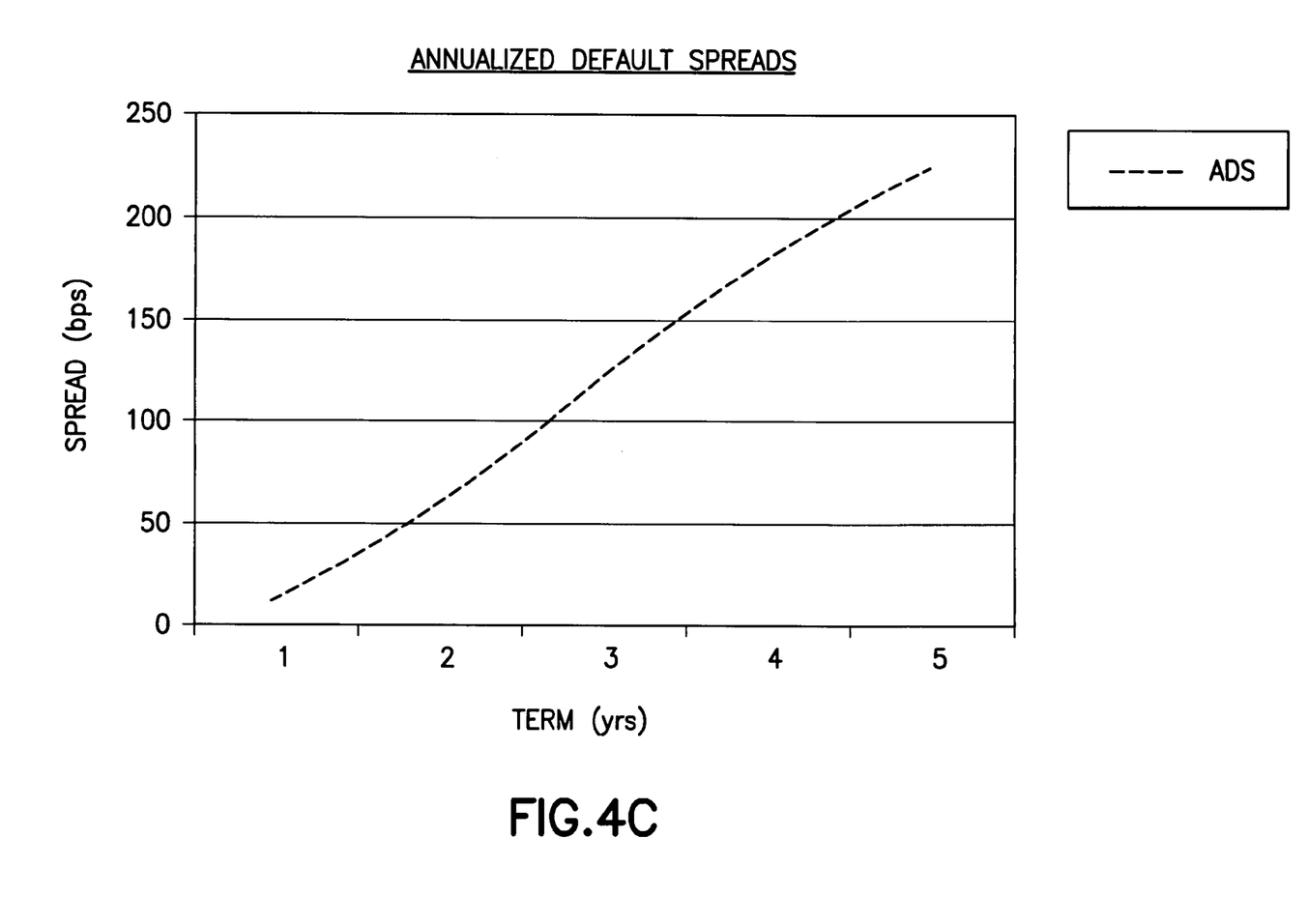

As illustrated in Tables 1B, 1D, 1F and 1H we have taken a very standard case of an relatively low-risk company with an upward slopping credit curve with the 5 year credit spread between 150 and 175 basis points, as well as a more risky case, with the 5 year credit spread around 400 basis points. The credit spread for these types of companies are illustrated generally in FIG. 4B or 4C. From Table 1B, we see that a higher variance of recovery of debt ($\lambda^2$) leads to higher short term credit spreads (1 or 2 years). However, the same higher variance of recovery of debt ($\lambda^2$) leads to lower long term credit spreads (8 or 10 years). From Tables 1D and 1H, a higher expected recovery of debt ($\overline{L}$) leads to higher short term spreads (1 or 2 years), while the same higher expected recovery of debt ($\overline{L}$) leads to lower long term spreads (8 or 10 years). However, intermediate durations (5 or 6 years) have less sensitivity to both of these parameters (λ and $\overline{L}$).

Note that the sensitivities in Tables 1A–1H were all determined with a constant stock volatility (σ*$_S$) of 50%.

It is important to keep in mind that the parameter $\overline{L}$ has an impact on the relationship between asset and stock volatility. Although we assume that asset volatility is constant, the calibration of asset volatility can only be done based on the observation of the actual stock volatility, historical or implied.

Normalized Probability of no Default

For certain types of transactions it is important to consider an embodiment of the instant invention where the probability of no default B(T) for a future time (e.g., T>0) is normalized by the probability of no default today (i.e., B(T) at time T=0). This is provided by Eq. 21 below:

$$Z_T = \frac{B(T)}{B(0)}. \tag{21}$$

It is understood that in the majority of cases, the probability of no default today B(0) is unity or close to it, and that therefore normalizing B(T) by B(0), according to Eq. 21, will yield the same or virtually the same value. However, there may be circumstances where B(0) is not unity, even though the company is not yet in default. For example, a company with semi-annual maturity dates on coupon bond payments may be unable to make the next coupon payment, which is due in 5 months, even though they are not yet in default. Using the instant invention, the company's probability of no default on short-term credit protection that extends beyond the next coupon payment, will be different depending upon whether the probability of no default is normalized or not. Accordingly, for some cases, it is desirable to normalize the probability of no default according to Eq. 21.

Applications for the Invention

The closed form formula above employs observable market data and financial data and parameters supported by many statistical sources and studies (Stock price and volatility, debt per share, mean and variance of recovery value of debt)

Using the system and method described above, it is possible to provide: credit spread calculations for high yield business applications including credit derivatives; risk management of credit default swaps and other credit derivative instruments; portfolio management; and economic capital calculations.

In particular, knowing the term structure of default probability allows one to compute credit spreads such as par credit default swap spreads, par floating rate notes spreads, par fix coupon spreads, asset swap spreads, etc. . . .

The invention also provides a robust relationship between credit spreads, equity prices and volatility that can be used as a price discovery tool to determine a fair market price of the credit risk, on a name by name basis, for illiquid credits that have public equity. The invention also allows use of equity derivatives to hedge credit risk on a name by name basis. The invention can be used to build a proprietary portfolio of relative value arbitrages between debt, equities and equity derivatives.

The closed form formula of default probability can also be used as a credit rating tool that feeds itself from observable parameters and market data that can be updated more frequently with recent information and stock prices.

The simplicity and transparency of the closed form solution makes it an ideal candidate to perform risk management and analysis of large portfolios of credit exposures. The computational efficiency of such a closed form formula allows for a large portfolio to be recomputed daily, or even more frequently during the day on a real time basis and allows the computation of economic capital, value at risks and stress tests.

Many of the parameters used in the invention are already used and implemented in Equity Derivatives and Credit Derivatives systems of pricing and risk management. Therefore, the invention can be easily implemented by financial institutions with a presence in the credit derivatives markets such as banks, brokers, dealers, insurance and re-insurance companies, equity and fixed income mutual funds, hedge funds involved in equities, straight and convertible debt, etc. . . .

The simplicity and transparency of the closed form solution, and the simple interpretation of the various parameters, can also be used by corporations and their management to assess the impact of various investment or financing strategies on their own corporate credit profile.

The simplicity, transparency and computational efficiency of the closed form solution, the simple interpretation of the various parameters, can be used by regulators or self regulating entities of financial institutions to increase the effectiveness of reporting and communication of credit risk exposures.

EXAMPLE

Using the instant invention, we provide the following example of determining the probability of no default of two different companies.

TABLE 2A

| | Stock Prices below | | | log return of prices below | |
|---|---|---|---|---|---|
| | "A" | | | "A" | "B" |
| | 7.6875 | | 17.6875 | | |
| 5/30/00 | 7.625 | 5/30/00 | 18.6875 | −0.008163 | 0.054997 |
| 5/31/00 | 8.5 | 5/31/00 | 18.5 | 0.108634 | −0.010084 |
| 6/1/00 | 8.625 | 6/1/00 | 20.5 | 0.014599 | 0.102654 |
| 6/2/00 | 8.5625 | 6/2/00 | 21.5625 | −0.007273 | 0.050531 |
| 6/5/00 | 8.4375 | 6/5/00 | 20.375 | −0.014706 | −0.056647 |
| 6/6/00 | 7.875 | 6/6/00 | 19.5625 | −0.068993 | −0.040694 |
| 6/7/00 | 7.6875 | 6/7/00 | 20.1875 | −0.024098 | 0.031449 |
| 6/8/00 | 7.8125 | 6/8/00 | 22.0625 | 0.016129 | 0.088816 |
| 6/9/00 | 7.625 | 6/9/00 | 21.4375 | −0.024293 | −0.028738 |
| 6/12/00 | 7.710938 | 6/12/00 | 19.9375 | 0.011207 | −0.072539 |
| 6/13/00 | 7.75 | 6/13/00 | 20.4375 | 0.005053 | 0.024769 |
| 6/14/00 | 7.875 | 6/14/00 | 18.5 | 0.016 | −0.099601 |
| 6/15/00 | 7.6875 | 6/15/00 | 19 | −0.024098 | 0.026668 |
| 6/16/00 | 7.625 | 6/16/00 | 18.25 | −0.008163 | −0.040274 |
| 6/19/00 | 7.5 | 6/19/00 | 18.6875 | −0.016529 | 0.02369 |
| 6/20/00 | 7.25 | 6/20/00 | 19.0625 | −0.033902 | 0.019868 |
| 6/21/00 | 7.1875 | 6/21/00 | 18.9375 | −0.008658 | −0.006579 |
| 6/22/00 | 6.9375 | 6/22/00 | 20.875 | −0.035402 | 0.097408 |
| 6/23/00 | 6.875 | 6/23/00 | 19.0625 | −0.00905 | −0.090829 |
| 6/26/00 | 6.8125 | 6/26/00 | 18.875 | −0.009132 | −0.009885 |
| 6/27/00 | 7 | 6/27/00 | 19.1875 | 0.027151 | 0.016421 |
| 6/28/00 | 6.878906 | 6/28/00 | 19.8125 | −0.01745 | 0.032054 |
| 6/29/00 | 6.875 | 6/29/00 | 19.125 | −0.000568 | −0.035317 |
| 6/30/00 | 6.8125 | 6/30/00 | 20.75 | −0.009132 | 0.08155 |
| 7/3/00 | 6.8125 | 7/3/00 | 20.375 | 0 | −0.018238 |
| 7/5/00 | 6.75 | 7/5/00 | 19.1875 | −0.009217 | −0.06005 |
| 7/6/00 | 6.75 | 7/6/00 | 19.75 | 0 | 0.028894 |
| 7/7/00 | 7.125 | 7/7/00 | 19.0625 | 0.054067 | −0.03543 |
| 7/10/00 | 7.125 | 7/10/00 | 18.1875 | 0 | −0.046989 |
| 7/11/00 | 7.125 | 7/11/00 | 17.625 | 0 | −0.031416 |
| 7/12/00 | 8.125 | 7/12/00 | 18.375 | 0.131336 | 0.041673 |
| 7/13/00 | 7.6875 | 7/13/00 | 18.375 | −0.05535 | 0 |
| 7/14/00 | 7.5625 | 7/14/00 | 19.9375 | −0.016394 | 0.081611 |
| 7/17/00 | 7.5 | 7/17/00 | 19.5625 | −0.008299 | −0.018988 |
| 7/18/00 | 7.5 | 7/18/00 | 19.6875 | 0 | 0.006369 |
| 7/19/00 | 7.6875 | 7/19/00 | 19 | 0.024693 | −0.035545 |

TABLE 2A-continued

| | Stock Prices below | | | log return of prices below | |
|---|---|---|---|---|---|
| | "A" | | | "A" | "B" |
| 7/20/00 | 7.625 | 7/20/00 | 17.75 | −0.008163 | −0.068053 |
| 7/21/00 | 7.4375 | 7/21/00 | 16.875 | −0.024898 | −0.050552 |
| 7/24/00 | 7.0625 | 7/24/00 | 16.125 | −0.051736 | −0.045462 |
| 7/25/00 | 7.375 | 7/25/00 | 15.75 | 0.043297 | −0.02353 |
| 7/26/00 | 7 | 7/26/00 | 15.0625 | −0.052186 | −0.044632 |

TABLE 2B

| | "A" | "B" |
|---|---|---|
| Reference stock volatility | 0.592124 | 0.822568 |
| Reference stock price | 7.463449 | 19.08929 |
| Current stock price | 7 | 15.0625 |
| Debt per share | 9.072 | 3.541 |
| Average recovery fraction | 0.5 | 0.5 |
| % deviation | 0.3 | 0.3 |
| Asset value V0 | 11.536 | 16.833 |
| Asset volatility | 0.368291 | 0.752751 |
| T = 3 years | 3 | 3 |
| T = 2 years | 2 | 2 |
| T = 1 year | 1 | 1 |
| d | 2.782715 | 10.40284 |
| At(T = 3) | 0.704922 | 1.337873 |
| At(T = 2) | 0.601063 | 1.106015 |
| At(T = 1) | 0.475014 | 0.81033 |
| At(T = 0) | 0.3 | 0.3 |
| B(3) | 0.765152 | 0.779467 |
| B(2) | 0.856743 | 0.901774 |
| B(1) | 0.949069 | 0.988413 |
| B(0) | 0.998932 | 1 |
| s(T = 3) | 0.088871 | 0.083048 |
| s(T = 2) | 0.076774 | 0.051696 |
| s(T = 1) | 0.051206 | 0.011655 |

Referring to Table 2 above, system 100 of the invention first collects recent stock share price information from the two companies (here reflected as Company A and Company B). In this example, the period of interest for determining the probability of no-default (T) is three years. Therefore, it is advantageous to select a sufficiently long period of recent stock share price information. In the example we have used two months of stock price information. However, longer or shorter relative periods may be appropriate, depending on the application of the invention. We will also use the closing share price in our calculations, though it is also possible to use some other consistent price, such as daily high, daily low or daily average.

Table 2A provides the daily closing price of the stock of Companies A and B for the most recent two months. Using this information, system 100 determines the respective volatilities $\sigma^*_S$ in that closing share price for each company. This is done by using the above described formula for determining volatility.

Next, by referring to any number of sources, such as the company annual reports, or regular SEC filings, we determine the debt per share D of each company.

Because Company A and Company B are in similar industries, by referring to the above-mentioned Moody's or Standard & Poor's reports, we find that an expected debt recovery fraction L in their industries is 50% (or 0.5). From the same sources, we find the percentage standard deviation $\lambda$ of the debt recovery fraction is 30% (or 0.3).

These factors allow us to determine the asset value $V_0$ and asset volatility $\sigma$, according to Eqs. (10) and (11) above.

Using these factors, we can then determine d according to Eq. (19) above, and $A_T^2$ and $A_T$ according to Eq. (18) above. This allows us to determine B(T) between time T=0 (today) and T=3 (three years in the future) for both companies.

Figure 5:
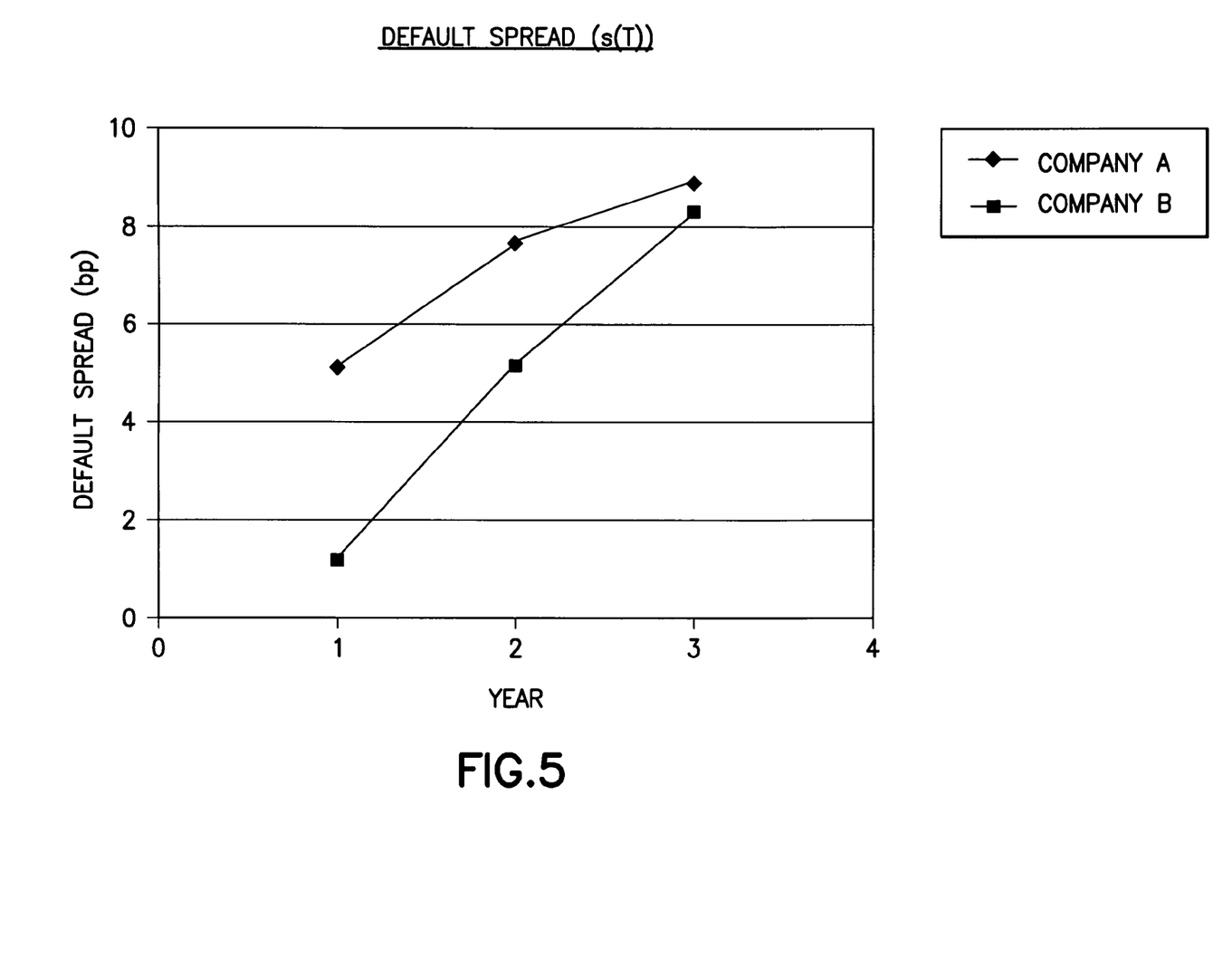
FIG. 5 illustrates annualized default spreads for two example companies.

Finally, the annualized default spread, s(T) for the three year time horizon is determined according to Eq. (20) and plotted for each company. This is illustrated for the example companies in FIG. 5.

Although illustrative embodiments have been described herein in detail, it should be noted and will be appreciated by those skilled in the art that numerous variations may be made within the scope of this invention without departing from the principle of this invention and without sacrificing its chief advantages.

In one embodiment, system 100 is a distributed computing system such as multiple computers or components interconnected on a local area network, wide area network, or computer components linked to each other over the Internet. The interconnection of the components or elements of the system may be wired, or wireless.

In one embodiment, the observable market information is maintained by database storage components of system 100.

In one embodiment, the observable market information is maintained external to system 100, but system 100 can access the information.

In one embodiment, the invention is used to rate individual financial instruments of a company, such as a bond.

In one embodiment, the invention is used to rate all financial instruments of a company.

In one embodiment, the invention is used to rate a portfolio of financial instruments from multiple companies.

In one embodiment, the invention is used to establish a price for financial instruments, or as one factor in establishing a price for financial instruments.

In one embodiment, the invention is used to compare risk of multiple companies and make investment decisions using at least the probability of no default of the companies.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

We claim:

1. A method at least partially implemented in a computer for determining a company's probability of no default over a time period between t=0 and t=T comprising:

determining a standard deviation $\sigma^*_s$ of past share prices in the company;

determining a current share price $S_0$ of the shares in the company determining a given share price $S^*$ of the shares in the company;

determining a debt per share D of the shares in the company;

determining a expected debt recovery fraction $\overline{L}$;

determining a percentage deviation $\lambda$ in the expected debt recovery fraction $\overline{L}$; and determining and displaying B(T) as the company's probability of no default between t=0 and t=T using at least $\sigma^*_s, S_0, S^*, D, \overline{L}$ and $\lambda$ with equations mathematically equivalent to:

$$d = \frac{(S_0 + \overline{L}D)\exp(\lambda^2)}{\overline{L}D};$$

$$A_T^2 = (\sigma^*_s S^* / (S^* + \overline{L}D))^2 T + \lambda^2; \text{ and}$$

$$B(T) = N\left[\frac{\ln(d)}{A_T} - 0.5A_T\right] - d * N\left[-\frac{\ln(d)}{A_T} - 0.5A_T\right],$$

wherein N is a cumulative normal distribution function.

2. A method according to claim 1, further comprising: determining a default spread s(t) for a time t=T using at least an equation mathematically equivalent to:

$$s(T) = -\left(\frac{1}{T}\right)\ln(B(T)).$$

3. A method according to claim 1, further comprising: determining a normalized probability of no default Z(t) for a time t=T, wherein B(T) is B(t) evaluated at time t=T, and B(0) is B(t) evaluated at time t=0, using at least an equation mathematically equivalent to:

$$Z(T) = \frac{B(T)}{B(0)}.$$

* * * * *

UNITED STATES PATENT AND TRADEMARK OFFICE
CERTIFICATE OF CORRECTION

PATENT NO. : 7,089,207 B1
APPLICATION NO. : 09/671783
DATED : August 8, 2006
INVENTOR(S) : Lardy et al.

It is certified that error appears in the above-identified patent and that said Letters Patent is hereby corrected as shown below:

Column 6, line 65, change "$S \leqq \leqq \overline{LD}$", to read -- $S << \overline{LD}$ --.

Column 7, line 59, change "give", to read -- given --.

Column 8, line 7, change "as should", to read -- σs should --.

Column 10, line 18, change "soures", to read -- sources --.

Column 10, line 25, change "(S)", to read -- (S*) --.

Column 11, line 13, change "A is a", to read -- λ is a --.

Column 13, line 50, change "slopping" to read -- sloping --.

Signed and Sealed this

Twelfth Day of June, 2007

JON W. DUDAS
*Director of the United States Patent and Trademark Office*